US006957197B1

(12) United States Patent
Altendahl et al.

(10) Patent No.: US 6,957,197 B1
(45) Date of Patent: Oct. 18, 2005

(54) LOAD PLANNING TABLES FOR A PARCEL SHIPPING SYSTEM

(75) Inventors: James R. Altendahl, Eagan, MN (US); Steven R. Lent, Burnsville, MN (US)

(73) Assignee: Pitney Bowes Inc., Stamford, CT (US)

( * ) Notice: Subject to any disclaimer, the term of this patent is extended or adjusted under 35 U.S.C. 154(b) by 0 days.

(21) Appl. No.: 09/475,881

(22) Filed: Dec. 30, 1999

(51) Int. Cl.⁷ ............................................. G06F 17/60
(52) U.S. Cl. ..................... 705/61; 705/60; 705/410; 705/7; 705/408; 235/375; 235/478
(58) Field of Search ........................ 705/1, 34, 402, 705/401, 60, 61; 235/435

(56) References Cited

U.S. PATENT DOCUMENTS

| | | | |
|---|---|---|---|
| 4,628,435 A | 12/1986 | Tashiro et al. | |
| 5,117,364 A * | 5/1992 | Barns-Slavin et al. | 705/407 |
| 5,124,926 A * | 6/1992 | Barns-Slavin et al. | 705/407 |
| 5,222,018 A | 6/1993 | Sharpe et al. | 364/406 |
| 5,481,464 A * | 1/1996 | Ramsden | 705/407 |
| 5,631,827 A | 5/1997 | Nicholls et al. | 395/228 |
| 5,666,493 A | 9/1997 | Wojcik et al. | 705/26 |
| 5,729,459 A | 3/1998 | Brandien et al. | 364/464.12 |
| 5,729,460 A | 3/1998 | Plett et al. | |
| 5,786,993 A | 7/1998 | Frutiger et al. | |
| 5,797,113 A * | 8/1998 | Kambe et al. | 701/201 |
| 5,869,819 A | 2/1999 | Knowles et al. | 235/375 |
| 5,923,017 A | 7/1999 | Bjorner et al. | 235/385 |
| 5,969,819 A | 10/1999 | Wang | 356/371 |
| 5,995,950 A * | 11/1999 | Barns-Slavin et al. | 705/402 |
| 6,018,725 A * | 1/2000 | Boucher et al. | 705/401 |
| 6,036,348 A * | 3/2000 | Miura | 235/375 |
| 6,041,318 A * | 3/2000 | Danford-Klein et al. | 705/400 |
| 6,064,981 A * | 5/2000 | Barni et al. | 705/26 |
| 6,064,994 A | 5/2000 | Kubatzki et al. | 235/275 |

(Continued)

FOREIGN PATENT DOCUMENTS

EP 1298552 A1 * 4/2003 ........... G06F 17/60

(Continued)

OTHER PUBLICATIONS

Arcelus, F.J., Rowcroft, J.E., "Freight Rates for Small Shipments", Jul. 1993, International Journal of Production Economics, vol. 30-31, pp. 571-577.

(Continued)

*Primary Examiner*—Firmin Backer
(74) *Attorney, Agent, or Firm*—Brian A. Lemm; Angelo N. Chaclas

(57) ABSTRACT

A system for managing shipping parcels that includes a specially adapted set of load planning tables, or, from another aspect, a set of load planning tables for use with a system for managing shipping parcels. The system includes: a planning system for providing a rated route; and a shipping database for providing stored planning information and for providing a stored rated route for shipping the parcel. Some of the shipping database is organized as a set of load planning tables, including: a group table, for storing group identifiers, each group identifier used to identify a group of one or more parcels; a load table, for storing records of attributes associated with a load, which is in turn associated with a group; a stop table, for storing records of attributes associated with a stop, which is in turn associated with a load; a shipment header table, for storing records of attributes associated with a shipment, which is in turn optionally associated with a stop; and a cost table, for storing records of attributes associated with a component cost of a load, which is in turn associated with a load.

4 Claims, 12 Drawing Sheets

U.S. PATENT DOCUMENTS

| | | | |
|---|---|---|---|
| 6,078,889 A * | 6/2000 | Boucher et al. | 705/1 |
| 6,230,872 B1 * | 5/2001 | Huang et al. | 198/368 |
| 6,233,568 B1 * | 5/2001 | Kara | 705/401 |
| 6,286,009 B1 * | 9/2001 | Mattioli et al. | 705/401 |
| 6,304,856 B1 | 10/2001 | Soga et al. | 705/28 |
| 6,304,857 B1 * | 10/2001 | Heindel et al. | 705/34 |
| 6,317,728 B1 | 11/2001 | Kane | |
| 6,321,214 B1 | 11/2001 | Thiel | 705/408 |
| 6,321,992 B1 | 11/2001 | Knowles et al. | 235/478.01 |
| 6,401,078 B1 | 6/2002 | Roberts et al. | |
| 6,424,948 B1 | 7/2002 | Dong et al. | |
| 6,456,986 B1 | 9/2002 | Boardman et al. | |
| 2002/0087375 A1 | 7/2002 | Griffin et al. | 705/7 |
| 2002/0174030 A1 * | 11/2002 | Praisner et al. | 705/26 |

FOREIGN PATENT DOCUMENTS

| | | | | |
|---|---|---|---|---|
| FR | 0 333 043 A1 | 3/1989 | | G06F 15/21 |

OTHER PUBLICATIONS

Stahl, Stephanie, "Information is Part of the Package—Package Delivery Companies are Using Innovative Technologies to Provide More Information to Customers", Information Week, 1996 n 596, p. 206.

Chabrow, Eric R., "Shipment Tracking—Data is Part of the Package—UPS and Rivals Offer Services to Help Clients Track Their Shipments", Information Week, 1995, n 559, p. 43.

Frook, John Evan, "Moving To A FedEx-tranet", Internet Week, 1997, n 695, p. 1, Dec. 22, 1997.

* cited by examiner

Direct Shipment Records from Load Planning Tables

Group

| Group ID |
|---|
| G1 |

Load

| Group ID | Load ID | Master Load | Carrier ID | Tariff | Pro # | Inbnd/Outbnd | Origin | Dest |
|---|---|---|---|---|---|---|---|---|
| G1 | L1 | ML1 | UPS | UPSGD | 1Z... | OUTBD | 55420 | 60601 |

Stop

| Group ID | Load ID | Stop # | DropBillNr | DropLoad | DropDC ID | Parent Load |
|---|---|---|---|---|---|---|
| G1 | L1 | 0 | B1 | | | |

Shipment Header

| Group ID | Load ID | Bill # | Origin | Dest |
|---|---|---|---|---|
| G1 | L1 | B1 | 55420 | 60601 |

Cost

| Group ID | Load ID | Cost Type | Amount |
|---|---|---|---|
| G1 | L1 | LINEHL | 25.00 |
| G1 | L1 | DOD | 10.00 |
| G1 | L1 | SATDEL | 5.00 |

FIG. 4B

Direct Consolidation Records from Load Planning Tables

Group

| Group ID |
|---|
| G1 |

Load

| Group ID | Load ID | Master Load | Carrier ID | Tariff | Pro # | Inbnd/Outbnd | Origin | Dest |
|---|---|---|---|---|---|---|---|---|
| G1 | L1 | ML1 | RDWY | 507A | 123 | OUTBD | 55420 | 60601 |

Stop

| Group ID | Load ID | Stop # | DropBillNr | DropLoad | DropDC ID | Parent Load |
|---|---|---|---|---|---|---|
| G1 | L1 | 0 | B1 | | | |
| G1 | L1 | 0 | B2 | | | |

Shipment Header

| Group ID | Load ID | Bill # | Origin | Dest |
|---|---|---|---|---|
| G1 | L1 | B1 | 55420 | 60601 |
| G1 | L1 | B2 | 55420 | 60601 |

Cost

| Group ID | Load ID | Cost Type | Amount |
|---|---|---|---|
| G1 | L1 | LINEHL | 1000.00 |
| G1 | L1 | INSDEL | 50.00 |

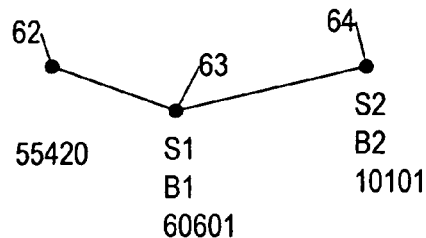

*Multistop Truckload Records from Load Planning Tables*

Group

| Group ID |
|---|
| G1 |

Load

| Group ID | Load ID | Master Load | Carrier ID | Tariff | Pro # | Inbnd/Outbnd | Origin | Dest |
|---|---|---|---|---|---|---|---|---|
| G1 | L1 | ML1 | DART | 500 | 123 | OUTBD | 55420 | 10101 |

Stop

| Group ID | Load ID | Stop # | DropBillNr | DropLoad ID | DropDC ID | Parent Load |
|---|---|---|---|---|---|---|
| G1 | L1 | 1 | B1 | | | |
| G1 | L1 | 2 | B2 | | | |

Shipment Header

| Group ID | Load ID | Bill # | Origin | Dest |
|---|---|---|---|---|
| G1 | L1 | B1 | 55420 | 60601 |
| G1 | L1 | B2 | 55420 | 10101 |

Cost

| Group ID | Load ID | Cost Type | Amount |
|---|---|---|---|
| G1 | L1 | LINEHL | 1000.00 |
| G1 | L1 | STPOFF | 50.00 |

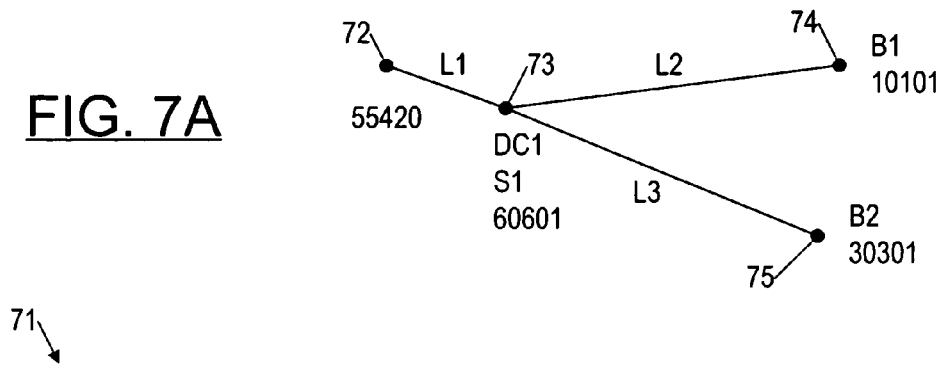

Distribution Center Truckload Records from Load Planning Tables

Group

| Group ID |
|---|
| G1 |

Load

| Group ID | Load ID | Master Load | Carrier ID | Tariff | Pro # | Inbnd/Outbnd | Origin | Dest |
|---|---|---|---|---|---|---|---|---|
| G1 | L1 | ML1 | DART | 500 | 123 | OUTBD | 55420 | 60601 |
| G1 | L2 | ML1 | UPS | UPSGD | 1Z... | OUTBD | 60601 | 10101 |
| G1 | L3 | ML1 | RDWY | 507A | 987 | OUTBD | 60601 | 30301 |

Stop

| Group ID | Load ID | Stop # | DropBillNr | DropLoad | Drop DC ID | Parent Load |
|---|---|---|---|---|---|---|
| G1 | L1 | 1 | | L2 | DC1 | |
| G1 | L1 | 1 | | L3 | DC1 | |
| G1 | L2 | 0 | B1 | | | L1 |
| G1 | L3 | 0 | B2 | | | L1 |

Shipment Header

| Group ID | Load ID | Bill # | Origin | Dest |
|---|---|---|---|---|
| G1 | L2 | B1 | 55420 | 10101 |
| G1 | L3 | B2 | 55420 | 30301 |

Cost

| Group ID | Load ID | Cost Type | Amount |
|---|---|---|---|
| G1 | L1 | LINEHL | 1000.00 |
| G1 | L2 | LINEHL | 25.00 |
| G1 | L2 | COD | 10.00 |
| G1 | L3 | MIN | 100.00 |
| G1 | L3 | COD | 10.00 |

Consolidation out of a Distribution Center Records from Load Planning Tables

Group

| Group ID |
|---|
| G1 |

Load

| Group ID | Load ID | Master Load | Carrier ID | Tariff | Pro # | Inbnd/Outbnd | Origin | Dest |
|---|---|---|---|---|---|---|---|---|
| G1 | L1 | ML1 | DART | 500 | 123 | OUTBD | 55420 | 60601 |
| G1 | L2 | ML1 | UPS. | UPSGD | 1Z... | OUTBD | 60601 | 10101 |
| G1 | L3 | ML1 | RDWY | 507A | 987 | OUTBD | 60601 | 30301 |

Stop

| Group ID | Load ID | Stop # | DropBillNr | DropLoad | DropDC ID | Parent Load |
|---|---|---|---|---|---|---|
| G1 | L1 | 1 | | L2 | DC1 | |
| G1 | L1 | 1 | | L3 | DC1 | |
| G1 | L2 | 0 | B1 | | | L1 |
| G1 | L3 | 0 | B2 | | | L1 |
| G1 | L3 | 0 | B3 | | | L1 |

Shipment Header

| Group ID | Load ID | Bill # | Origin | Dest |
|---|---|---|---|---|
| G1 | L2 | B1 | 55420 | 10101 |
| G1 | L3 | B2 | 55420 | 30301 |
| G1 | L3 | B3 | 55420 | 30301 |

Cost

| Group ID | Load ID | Cost Type | Amount |
|---|---|---|---|
| G1 | L1 | LINEHL | 1000.00 |
| G1 | L2 | LINEHL | 25.00 |
| G1 | L2 | COD | 10.00 |
| G1 | L3 | LINEHL | 200.00 |
| G1 | L3 | COD | 10.00 |

Combination Multistop, Distribution Center, and Consolidation Records

Group

| Group ID |
|---|
| G1 |

Load

| Group ID | Load ID | Master Load | Carrier ID | Tariff | Pro # | Inbnd/Outbnd | Origin | Dest |
|---|---|---|---|---|---|---|---|---|
| G1 | L1 | ML1 | DART | 500 | 123 | OUTBD | 55420 | 70101 |
| G1 | L2 | ML1 | UPS | UPSGD | 1Z... | OUTBD | 60601 | 10101 |
| G1 | L3 | ML1 | RDWY | 507A | 987 | OUTBD | 60601 | 30301 |

Stop

| Group ID | Load ID | Stop # | DropBillNr | DropLoad | DropDC ID | Parent Load |
|---|---|---|---|---|---|---|
| G1 | L1 | 1 | B1 | | | |
| G1 | L1 | 1 | B2 | | | |
| G1 | L1 | 2 | | L2 | DC1 | |
| G1 | L1 | 2 | | L3 | DC1 | |
| G1 | L1 | 3 | B6 | | | |
| G1 | L2 | 0 | B3 | | | L1 |
| G1 | L3 | 0 | B4 | | | L1 |
| G1 | L3 | 0 | B5 | | | L1 |

Shipment Header

| Group ID | Load ID | Bill # | Origin | Dest |
|---|---|---|---|---|
| G1 | L1 | B1 | 55420 | 59101 |
| G1 | L1 | B2 | 55420 | 59101 |
| G1 | L2 | B3 | 55420 | 10101 |
| G1 | L3 | B4 | 55420 | 30301 |
| G1 | L3 | B5 | 55420 | 30301 |
| G1 | L1 | B6 | 55420 | 70101 |

Cost

| Group ID | Load ID | Cost Type | Amount |
|---|---|---|---|
| G1 | L1 | LINEHL | 1000.00 |
| G1 | L1 | STPOFF | 100.00 |
| G1 | L2 | LINEHL | 25.00 |
| G1 | L2 | COD | 10.00 |
| G1 | L3 | LINEHL | 200.00 |

FIG. 9B

Nested Loads Records from Load Planning Tables /101

Group

| Group ID |
|---|
| G1 |

Load

| Group ID | Load ID | Master Load | Carrier ID | Tariff | Pro # | Inbnd/Outbnd | Origin | Dest |
|---|---|---|---|---|---|---|---|---|
| G1 | L1 | ML1 | DART | 500 | 123 | OUTBD | 55420 | 70101 |
| G1 | L2 | ML1 | ABC | 500 | 543 | OUTBD | 60601 | 20201 |
| G1 | L3 | ML1 | UPS | UPSGD | 1Z... | OUTBD | 20201 | 10101 |
| G1 | L4 | ML1 | RDWY | 507A | 987 | OUTBD | 20201 | 30301 |

Stop

| Group ID | Load ID | Stop # | DropBillNr | DropLoad | DropDC ID | Parent Load |
|---|---|---|---|---|---|---|
| G1 | L1 | 1 | B1 | | | |
| G1 | L1 | 1 | B2 | | | |
| G1 | L1 | 2 | | L2 | DC1 | |
| G1 | L1 | 3 | B3 | | | |
| G1 | L2 | 1 | B4 | | | L1 |
| G1 | L2 | 2 | | L3 | DC2 | L1 |
| G1 | L2 | 2 | | L4 | DC2 | L1 |
| G1 | L3 | 0 | B5 | | | L2 |
| G1 | L4 | 0 | B6 | | | L2 |
| G1 | L4 | 0 | B7 | | | L2 |

Shipment Header

| Group ID | Load ID | Bill # | Origin | Dest |
|---|---|---|---|---|
| G1 | L1 | B1 | 55420 | 59101 |
| G1 | L1 | B2 | 55420 | 59101 |
| G1 | L1 | B3 | 55420 | 70101 |
| G1 | L2 | B4 | 55420 | 44101 |
| G1 | L3 | B5 | 55420 | 10101 |
| G1 | L4 | B6 | 55420 | 30301 |
| G1 | L4 | B7 | 55420 | 30301 |

Cost

| Group ID | Load ID | Cost Type | Amount |
|---|---|---|---|
| G1 | L1 | LINEHL | 1000.00 |
| G1 | L1 | STPOFF | 100.00 |
| G1 | L2 | LINEHL | 500.00 |
| G1 | L2 | STPOFF | 50.00 |
| G1 | L3 | LINEHL | 25.00 |

FIG. 10B

LOAD PLANNING TABLES FOR A PARCEL SHIPPING SYSTEM

CROSS REFERENCE TO RELATED APPLICATIONS

The present invention is related to the following U.S. applications: U.S. application Ser. No. 09/475,880 filed Dec. 30, 1999 entitled, "A PLANNING ENGINE FOR A PARCEL SHIPPING SYSTEM"; U.S. application Ser. No. 09/476,717 filed Dec. 30, 1999 entitled, "A SYSTEM FOR MANAGING PARCEL SHIPPING"; U.S. application Ser. No. 09/475,883 filed Dec. 30, 1999 entitled, "A RATER UTILITY FOR A PARCEL SHIPPING SYSTEM"; and U.S. application Ser. No. 09/475,882 filed Dec. 30, 1999 entitled, "A ROUTER UTILITY FOR A PARCEL SHIPPING SYSTEM". All of the applications are assigned to the present assignee and filed on the same date hereof. The subject matter of each of these applications is hereby incorporated by reference.

FIELD OF THE INVENTION

The present invention pertains to the field of software engineering for parcel shipping, and more particularly to planning the shipping of parcels, including performing routing and rating for the shipping of parcels.

BACKGROUND OF THE INVENTION

Companies that provide items such as finished goods or raw materials have a lot of choice in how the items are shipped (in the sense of parcel shipping). If choices are made correctly, the shipper can realize significant savings. The choices, however, are complex enough that having to analyze options for any particular shipping requirement is likely to overwhelm the typical shipping department employee. Although making a choice in how to ship a parcel could be automated for any particular shipper (the sender, not the carrier), the cost of doing so is great enough that most shippers would be reluctant to go ahead with automating the shipping options analysis.

The principal elements of planning the shipping of a parcel or a batch of parcels are first, determining a route for the parcel or each parcel in a batch of parcels (called routing), and second, determining a rate for the parcel or for each parcel in the batch of parcels. In planning for a single parcel, only routing and rating are performed. In planning for shipping a batch of parcels, it is also desirable to examine opportunities to consolidate the parcels, and if some shipments can be consolidated, to prorate the costs of shipping each consolidated parcel (i.e. to apportion the costs of a load of several consolidated shipments of parcels among the individual parcels).

Given an overall system for managing parcel shipping, such as that disclosed in the related application, "SYSTEM FOR MANAGING PARCEL SHIPPING," what is needed is a set of related tables for representing plans for shipping parcels, plans that can include shipping a parcel in cooperation with the shipping of other parcels. Ideally, such a set of tables would include allowing plans for a direct shipment; a direct consolidation; a multistop truckload; a distribution center truckload; a consolidation out of a distribution center; a combination multistop, distribution center, and consolidation; and nested loads.

SUMMARY OF THE INVENTION

Accordingly, the present invention provides a system for managing shipping parcels, including: a planning system, responsive to requests to plan shipping for a parcel and responsive to stored planning information and to interactive planning information, for providing a rated route; and a shipping database, responsive to updates to planning information, for providing stored planning information, further responsive to a customer order including shipping requirements for the customer order, and further responsive to the rated route, for providing a stored rated route for shipping the parcel, the shipping database including a set of load planning tables. The set of load tables includes: a group table, for storing group identifiers, each group identifier used to identify a group of one or more parcels; a load table, for storing records of attributes associated with a load, which is in turn associated with a group, each record having a group identifier field and a load identifier field; a stop table, for storing records of attributes associated with a stop, which is in turn associated with a load, which is in turn associated with a group, each record having a group identifier field, a load identifier field, a stop identifier field, and a drop bill number field; a shipment header table, for storing records of attributes associated with a shipment, which is in turn optionally associated with a stop, which is in turn associated with a load, which is in turn associated with a group, each record having a group identifier field, a load identifier field, a bill number field that serves as a shipment identifier and optionally relates the record to a record in the stop table via the drop bill number field in records of the stop table, an origin identifier field, and a destination identifier field; and a cost table, for storing records of attributes associated with a component cost of a load, which is in turn associated with a load, which is in turn associated with a group, each record having a group identifier field, a load identifier field, a field indicating a cost type, and a field indicating a cost amount.

In a further aspect of the invention, the records of the load table also include fields for indicating a master load identifier, a carrier identifier, a tariff identifier, an origin and a destination.

In a still further aspect of the invention, each record of the load table also include a field for indicating a pro number, a field for an inbound/outbound indicator, a field indicating an origin, and a field indicating a destination.

In even a still further aspect of the invention, the records of the stop table also include fields for indicating a drop load identifier, a drop distribution center identifier, and a parent load.

In another aspect of the invention, what is provided is a set of load planning tables, as described above, for use with a system for managing shipping parcels.

BRIEF DESCRIPTION OF THE DRAWINGS

The above and other objects, features and advantages of the invention will become apparent from a consideration of the subsequent detailed description presented in connection with accompanying drawings, in which:

FIG. 4A is a schematic illustration of a direct shipment, and FIG. 4B shows corresponding records from the load planning tables;

FIG. 6A is a schematic illustration of a multistop truckload, and FIG. 6B shows corresponding records from the load planning tables;

FIG. 7A is a schematic illustration of a distribution center truckload, and FIG. 7B shows corresponding records from the load planning tables;

FIG. 8B shows corresponding records from the load planning tables;

FIG. 9B shows corresponding records from the load planning tables; FIG. 10B shows corresponding records from the load planning tables.

BEST MODE FOR CARRYING OUT THE INVENTION

The Overall System for Managing Parcel Shipping

Figure 1:
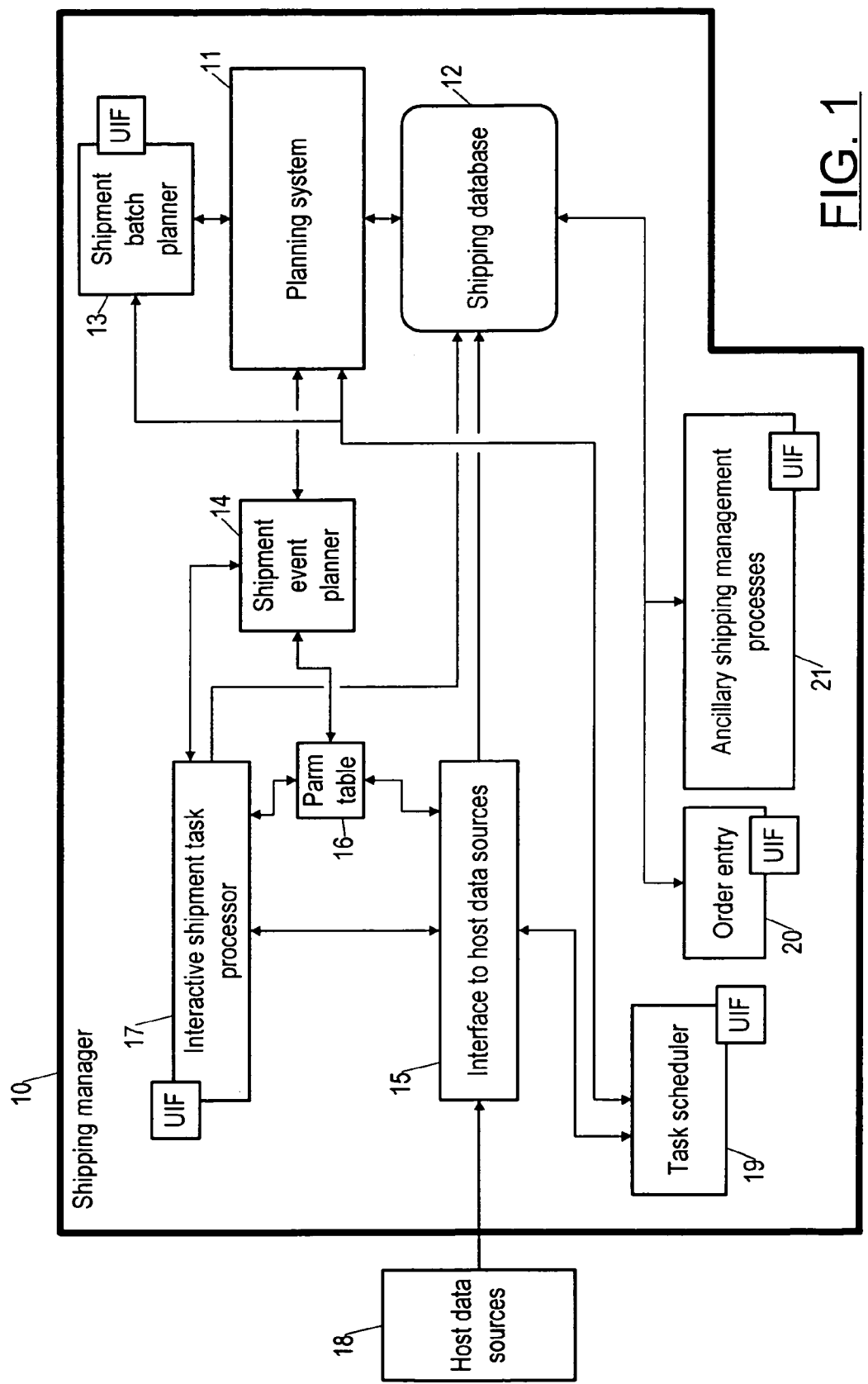
FIG. 1 is a block diagram, with oriented lines indicating the direction of dataflow, of a shipping manager according to the present invention.

Referring now to FIG. 1, a shipping manager 10 according to the present invention is a system for managing all aspects of shipping a parcel, from order entry creating for the shipping manager a requirement to ship the parcel, to picking and packing items to be included in the parcel, to getting the parcel to its destination according to any constraints on its shipment. The shipping manager 10 can be used as a standalone application, preferably executing under Microsoft Corporation's WINDOWS 95 operating system or a more recent similar operating system. It can also be executed on a server attached to a network. Finally, it can be used in concert with other, independent shipping related applications, and when used in this mode, can extract data from host data sources 18 of the independent shipping related applications for integration into its own various data stores.

The invention will now be described, with reference to FIG. 1 and also to FIG. 2, in terms of a scenario in which a user, called here a seller, who is an employee of a direct seller of (personal computer) business systems, has received an order for a business system to be shipped to a customer (consignee), a business. In the scenario, the shipping manager 10 executes in the standalone mode. The seller has agreed to ship the business system according to a prior understanding with the customer business. The agreement is that a business system is to be shipped so as to arrive no later than two weeks from the date of the order for the business system, and otherwise is to be shipped as inexpensively as possible. The business system includes various items, such as a computer according to the consignee's specification, a monitor, and a keyboard and mouse.

Figure 2:
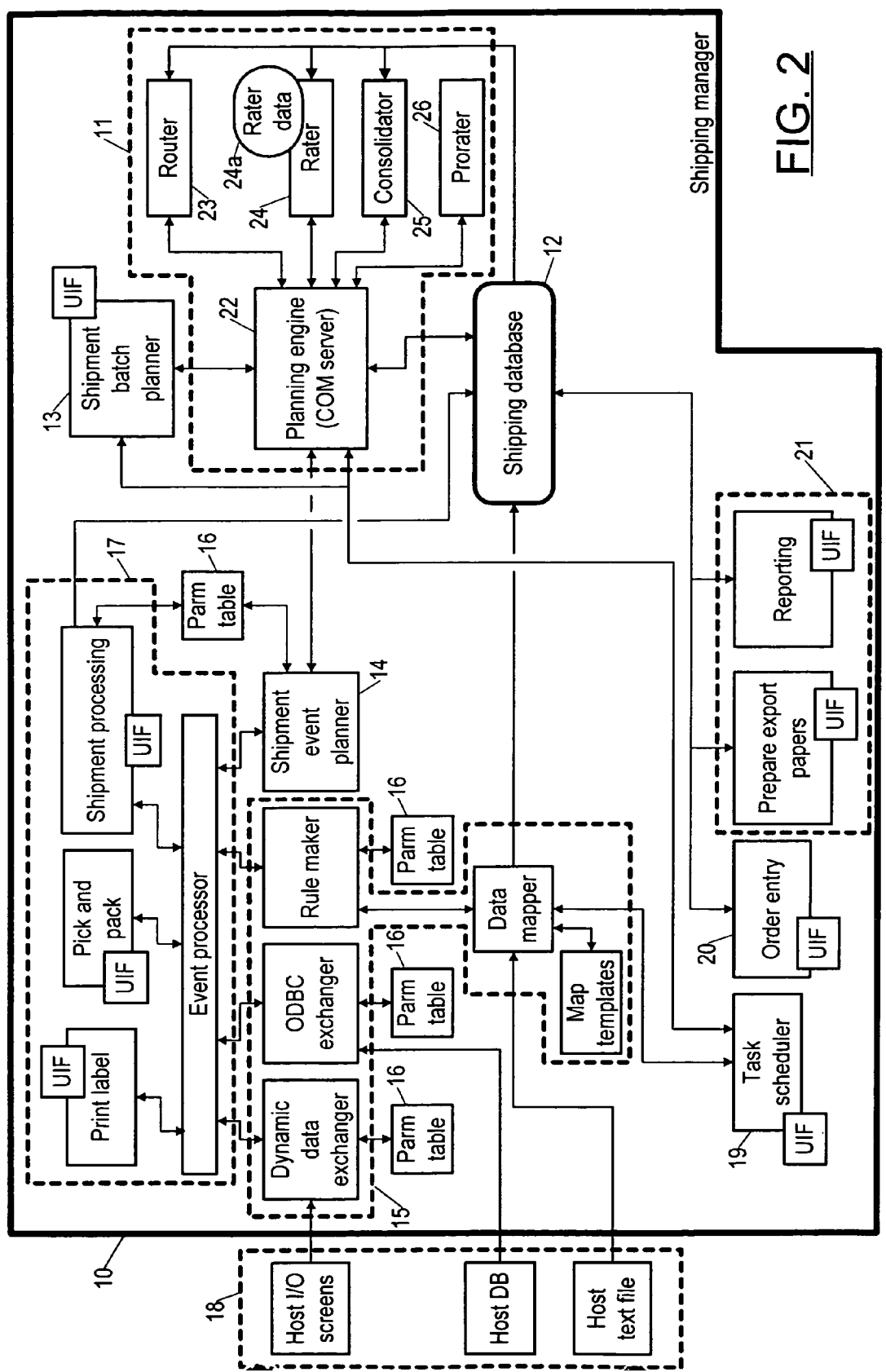
FIG. 2 is another block diagram showing the shipping manager of FIG. 1 in greater detail.

Still referring to FIG. 1 and also to FIG. 2, the seller enters the order through a user interface (UIF) provided with an order entry module 20, which stores the order in a shipping database 12. The order includes, in general, a shipper, a service (ground, overnight, and so on), charge terms, payment terms, ship-to address information, and a recitation of each item ordered. In the present scenario, however, the shipper and service are not specified.

An order can be entered in other ways besides using the order entry module 20. An order can also be entered via electronic data interchange (EDI), for which the system provides an EDI interface (not shown). An order can also be entered by downloading it from a host system file via a data mapper included as part of an interface 15 to host data sources, which is described below.

Next, the seller engages an interactive shipment task processor 17, including a pick and pack module (see FIG. 2), and uses the pick and pack module to pick the items ordered from stock and to place them into shipping resources such as cartons, pallets and containers. The shipping manager keeps track of the contents of each resource and also, conversely, the resource in which each item ordered is packed. It can automatically assign resource numbers or use user-supplied identifiers. In the present scenario, all of the items are packed in a single resource to which the shipping manager 10 automatically assigns a resource number.

With the items picked and packed, the seller engages a shipment processing module (FIG. 2), which is another module of the interactive shipment task processor 17. The shipment processing module enables the user to arrange for shipping the ordered items, now all associated with a single resource in this scenario. In general, though, an order can be packed into several different resources and can then be divided up into several shipments. In the scenario, the resource is an entire shipment, i.e. a shipment is created that contains only the single resource that in turn includes all of the items ordered by the customer.

The first thing to be done in shipment processing is to route the shipment. Essentially, routing consists of identifying what carriers and services could be used to deliver the shipment, given any routing instructions provided by the consignee. Routing instructions are an example of a so-called business rule, and the shipping manager 10 allows using conditional logic ("if then" logic) to express the business rules. For example, a routing instruction (business rule) might be: if a shipment is going to Chicago, then use Alpha Freight Service. The shipping manager 10 allows the simultaneous application of various business rules. So, for example, in addition to the Chicago rule, the shipping manager 10 might apply the following rules: if expected delivery is Saturday, then use Bravo Freight Service; and if a shipment weighs 400 to 1,500 lbs., then use Charlie Freight Service.

The business rules can be stored in the shipping database 12 (each rule being saved using a route ID as an index for retrieving the rule), and can be created through the shipment processing module (FIG. 2) of the interactive shipment task processor 17, or through the shipment batch planner 13. In addition, business rules can be extracted from host data sources 18, via an interface 15 to the host data sources, provided to the interactive shipment task processor 17, and optionally saved to the shipping database 12. It is also possible, using the interactive shipment task processor 17, to have the shipping manager 10 retrieve as needed some or all business rules from the host data sources 18, and in particular from a host text file (FIG. 2) that is part of the host data sources 18.

The system provides for business rules not only for a consignee, but for shippers, third parties, and bill-to-addressees. Business rules can be prioritized based on charge terms of the shipment, typically based on who is paying for the shipping. Other bases for prioritizing are also possible, such as origin of a rule, i.e. whether the rule is a consignee-rule, shipper-rule, third-party-rule, and so on. A route priority table is used determine priority, as discussed below.

In the scenario here, the consignee has as a business rule the agreement noted above, namely that a business system is to be shipped so as to arrive no later than two weeks from the date of the order for the business system, and otherwise is to be shipped as inexpensively as possible. The business rule is stored in the shipping database 12.

In the scenario, then, the shipment is routed by applying the business rules on file (in the shipping database 12) for the consignee. The result of the routing is that various carriers and services are acceptable (because the identified carriers provide the identified services in shipping to the consignee's address), at least according to the business rules on file for the consignee. Specifically, Alpha, Bravo and Delta are all possible choices, using as the service of each either ground or air.

The routing is performed by the planning system 11, invoked by the interactive shipment task processor 17. As shown in FIG. 2, the planning system 11 includes a planning engine 22 that is a component object module (COM) server, as well as various modules that can be called by the planning engine 22: a rater 24, a router 23, a consolidator 25, and a prorater 26. A COM server, such as is available with Microsoft WINDOWS 95 and later versions and also with Microsoft WINDOWS NT, uses a standard interprocess communication protocol to effectively perform a run-time linking of processes that execute as standalone modules. It is used especially for implementing a distributed application enabling component standalone modules to cooperate to accomplish the overall aims of the application. The component processes may even exist on different computers connected through the Internet.

The interactive shipment task processor 17 invokes the planning system 11 through the action of a shipment event planner 14. Within the interactive shipment task processor 17 (FIG. 2), individual modules such as the shipment processing module, engage the shipment event planner through an event processor. The shipment processing module creates an event to be processed. Here, with the shipment identified as ZZZZ, so as to get the shipment routed, the shipment processing module creates as an event: route shipment ZZZZ. An event processor (FIG. 2) then invokes the shipment event planner, which in turn engages the planning engine 22 of the planning system 11. The planning engine 22 then activates its router 23, which extracts from the shipping database 12 any business rules on file for the consignee, and determines a list of candidate routes, each acceptable according to the business rules on file.

In general, the event processor responds not only to individual events, but also to associated subevents. If an event has subevents, the event itself is termed a master event. As an example, a master event can be defined to be "rating a shipment." Subevents can then be defined to be "rating and updating the shipment" and "saving it" (to the shipping database 12), "creating a label" (through the print label module of the interactive shipment task processor 17), and "validating the shipment's fields," i.e. each field of a shipping label, such as the fields indicating the consignee's name and address. The shipping manager 10 includes a set of pre-determined master events to which the seller (shipper) can add subevents. The seller can also add other master events and sub-event for the other master events.

Having routed the shipment and so determined what carriers and services are possible, the seller must next rate the different routes, i.e. determine which to use, assuming that more than one possible route is provided as a candidate route by the router 23 function. For the rating, the seller again uses the interactive shipment task processor 17, and in particular the shipment processing module. The seller inputs to the event processor, as an event to be processed, the rating of the shipment. The event processor then engages the shipment event planner 14, which in turn invokes the planning engine 22 of the planning system 11. The planning engine 22 first uses a rater (module) 24 (FIG. 2), which is part of the planning system, to determine the least expensive of the candidate routes. The rater 24 includes static rater data 24a, such as tariffs for the different services of various carriers, in an associated set of tables accessible only by the rater module 24. It uses the rater data 24a to determine a cost for each candidate route. In the scenario, the rater 24 determines that Alpha Freight Service seven-day service is the least cost route.

In general, though, the router 23 and rater 24 are caused by the planning engine 22 to work in concert to select a carrier based on a range of parameters. Carriers can be pre-selected, based on data passed from the order processing system. Alternatively, selection can be guided or even determined by routing instructions (business rules). Finally, carriers can be selected by a combination of business rules, routing, and rating, as in the scenario.

Another means by which the seller can tailor route selection is to define a group of carriers to be considered in rating a shipment. Then only a carrier in the defined group is rated. Another means is to allow the seller to apply a penalty to any rating for a predetermined carrier so that the selection of the carrier is less likely compared to other carriers, even if the disfavored carrier has a route at a same or better cost compared to the other carriers.

The actions taken by the shipping manager 10 in performing its routing and rating functions, based on what business rules or other guidance have been prescribed, are as indicated in table 1.

As shown in table 1, it is possible to have specific routing instructions, i.e. a specific route (carrier and service), and in such a case, no routing and rating is performed; the specified route is used. Specified routing instructions are provided either by the customer at order entry or as business rules.

TABLE 1

Rating actions taken by the shipping manager depending on instructions for routing.

| Carrier | Service | Rate Shop Group | Routing Instructions (Route ID) | Both shipper and consignee have routing instructions | Action |
| --- | --- | --- | --- | --- | --- |
| no | no | no | no | no | Shop all carriers and services in system. |
| no | no | no | no | YES | Use route priority table to determine whose instructions are to be followed. |

TABLE 1-continued

Rating actions taken by the shipping manager depending on instructions for routing.

| Carrier | Service | Rate Shop Group | Routing Instructions (Route ID) | Both shipper and consignee have routing instructions | Action |
|---------|---------|-----------------|----------------------------------|------------------------------------------------------|--------|
| no | no | no | YES | n/a | Use route instructions from ShipHder Route ID. |
| no | no | YES | n/a | n/a | Shop all carriers in the rate shop group. |
| no | YES | n/a | n/a | n/a | Shop all carriers supporting the service. |
| YES | n/a | n/a | n/a | n/a | Shop all services for the specified carrier. |
| YES | YES | n/a | n/a | n/a | Use specified carrier and service. |

Table 1 also shows that it is possible to have shipping instructions (provided by the records with a same route ID) provided by two sources, such as the shipper (the seller in the scenario) and the consignee for a shipment (the customer in the scenario). If these conflict, then the shipping manager uses a route priority table to determine which instructions are to be given precedence. Usually, precedence will be given to the instructions from the entity paying for the shipping charges.

In the scenario, with the shipment routed and rated, the seller can print a label using the print label module of the interactive shipping module 17. The seller can print a carrier label (specific to a particular carrier including mail labels) or a regular shipper label. In addition, the seller can print a billing label, a bill of lading, or a hazardous materials label. Some of the labels can be printed from other interfaces besides those provided by the interactive shipment task processor 17, such as a shipment batch planner 13 and an end-of-day processing module (not shown).

Finally, if the shipment of the scenario were for a foreign country, the seller could create export documentation using the prepare export papers module of an ancillary shipping management processes module 21. For monitoring the shipment in particular, or for monitoring more generally, the shipping manager 10 includes a reporting module as one of the ancillary shipping management processes module 21. The reporting module extracts report data from the shipping database 12.

In the scenario, the seller interactively processed an order using the shipment processing module (FIG. 2) of the interactive shipment task processor 17. The shipping manager 10 also allows batch processing of orders after they are entered into the system by the order entry module 20 or by other means, including electronic downloading from remote order entry locations (not shown). To arrange for batch processing of an order, the seller uses a task scheduler 19 to indicate that shipping for an order is to be planned in batch mode, and then, still using the task scheduler, can prompt a shipment batch planner 13 to batch process any shipments in the shipping database marked for batch processing. (The shipping manager also allows the seller to use the shipment batch planner 13 to initiate the batch processing of any shipments in the shipping database 12 marked for batch processing.)

The shipment batch planner performs the same functions for each shipment in a batch of shipments as the interactive shipment task processor performs for a single shipment, i.e. it performs routing and rating using the planning system 11. However, in batch processing mode, the planning system 11 also iterates in its planning to take advantage of opportunities to consolidate shipments in the batch. The planning engine 22 of the planning system 11 invokes a consolidator (module) 25 (also part of the planning system 11) to attempt to consolidate any or all shipments in the batch of shipments, unless there are instructions not to consolidate. If the consolidator 25 is able to consolidate a shipment with one or more other shipments, the planning engine 22 will then prorate the shipment by invoking a prorater 26, also part of the planning system 11.

In attempting to consolidate shipments, the consolidator 25 searches the batch of shipments for all shipments having matching required properties. Usually these will include the shipper, consignee, and shipment date. However, it is also possible that other properties must match for a consolidation to be possible. For example, it is possible that a carrier is pre-specified. In all, the consolidator 25 can require that the following properties match in order for a consolidation to be acceptable: shipment date, shipper, consignee, bill-to, pre-specified carrier, pre-specified service, charge terms, inbound versus outbound, rate ship group, route ID, required delivery date, and hazardous commodity.

Next the consolidator 25 creates a routing list of carriers that can handle the shipment. Then it consolidates shipments based on either a least restrictive or a most restrictive bases. In the least restrictive basis, a carrier is selected from the routing list that can meet the earliest required delivery date specified on any shipment in the consolidation. In the most restrictive basis, a carrier is selected from the routing list that can meet the latest required delivery date specified on any shipment in the consolidation.

The task scheduler 19 also allows scheduling any other kind of task performed by the shipping manager 10. Tasks that can be scheduled include: sending and receiving pre-defined electronic data interchange (EDI) transaction sets; emptying database tables; placing shipments in a group with pre-defined selection criteria; packing a group of orders with pre-defined criteria in batch mode; printing bills of lading with pre-defined selection criteria; printing pick tickets with pre-defined selection criteria; printing a pre-defined report; purging a pre-defined group and its loads and shipments; purging shipments and orders based on pre-defined selection criteria; running a batch or executable file synchronously; rating and planning a pre-defined group of shipments; and creating a small package manifest based on pre-defined selection criteria.

Some of these tasks involve updating the shipping database 12 based on information in the host data sources 19, and in particular based on information in host text files (FIG. 2), as one component of the host data sources 19. For these tasks, the task scheduler 19 is used to schedule the data mapper (FIG. 2), of the interface 15 to host data source, to update the shipping database 12 based on information in the host text files. The data mapper then uses map templates (FIG. 2) to determine what data in the host text files maps into what field in the shipping database. The data in the host text files is often in a fixed format; then the map templates indicate (usually in terms of row and column) the beginning of a data item in a host text file, and by a format specification or other means indicate a length of the data item to be mapped.

The interface 15 to host data sources enables a host application and the shipping manager to share various data. The sharing is enabled by dynamic data exchange (DDX) provided by a dynamic data exchanger; by an open data base connectivity (ODBC) exchanger, for exchanging data items maintained in the shipping database and in a host database; and by a data mapper, which acquires data from text files in a host environment and provides data to the host environment as text files. The data mapper is used in particular for acquiring business rules for guidance in routing, possibly expressed using conditional logic.

As explained above, an order can be entered by downloading it from a host system file via the data mapper included as part of the interface 15 to host data sources.

FIG. 2 shows that the dynamic data exchanger module, ODBC exchanger module and rule maker module of the interface 15 to host data source share information via a parameter table (parm table) 16. Other modules also use the parm table 16 to share data. For clarity, the parm table 16 is shown as several different blocks in FIG. 2, although each block represents the same physical parameter table.

Load Planning Tables

Still referring to FIGS. 1 and 2, the shipping database 12 includes a set of related load planning tables (discussed below) that are used to store a plan for shipping a parcel. Usually, a plan for shipping a parcel is first stored in the load planning tables of the shipping database 12 with various fields left undetermined. As the planning system 11 completes the plan for shipping a parcel, the fields of the records for the plan in the various related tables are updated. In formulating the plan, the planning system 11 uses a data structure called a load list.

Figure 3A:
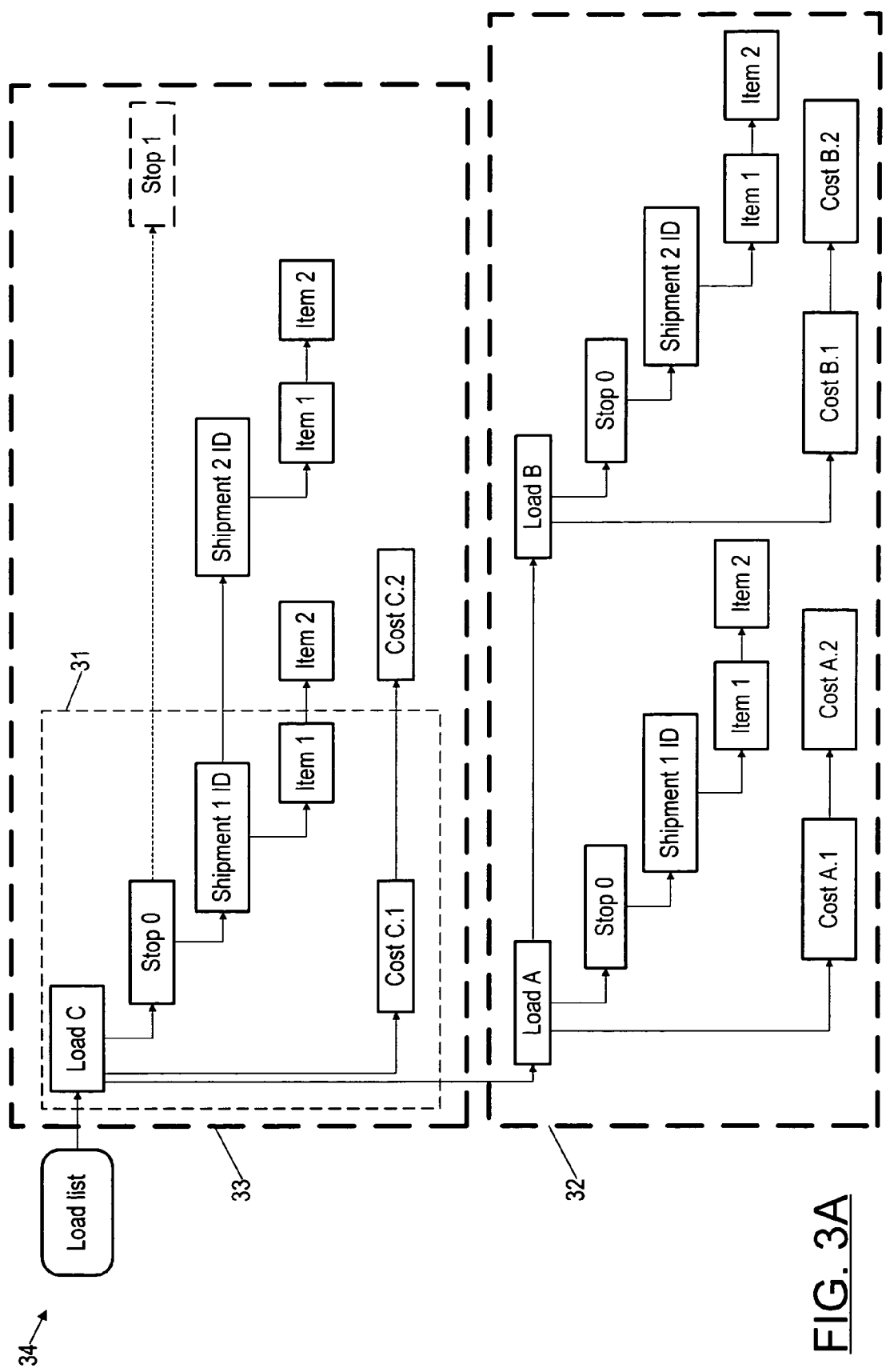
FIG. 3A is a data structure diagram indicating the structure of a load list.

Referring now to FIG. 3A, a load list (structure) 34 is shown as including a load list primitive 31, out of which any load list can be developed. The load list primitive 31 includes the following fields: a load (identifier), having an associated stop (identifier), the stop having an associated shipment, the shipment identifier having an associated item. In addition, the load has an associated cost (which is a component cost, and not therefore necessarily an overall cost).

A full load list grows out of the load list primitive 31 in different ways, depending essentially on whether the load list is for a direct shipment or for a consolidation. In case of a direct shipment, the corresponding load list can have different stops for different loads, and can have more than one shipment (associated with the stop). The load list fragment 32 associated with Load C, if it were a standalone load list, would be an example of a direct load list, indicating a shipment of shipment 1 (as load A) to a stop "0" and a shipment (as load B) to the same stop "0". Although here the shipments of the different loads (load A and load B) are to be delivered to the same stop, in general a direct load list can include a load having a different stop than the other loads in the load list. In addition, each load can have multiple stops, as suggested by the dashed outline of Stop 1 of Load C. As indicated, load A has various component costs, A.1 and A.2, and similarly for load B. Examples of component costs include the basic charge for a service, a special charge for Saturday delivery, and a special charge for an inside pickup.

In case of a consolidation, where two or more shipments are consolidated into a single load, the corresponding load list includes a consolidation load list fragment 33, and also includes the direct load list fragment 32 indicating the loads that are consolidated in the consolidation load list fragment. The direct load list fragment 32 corresponding to a consolidation load list fragment 33 is included in the overall load list 34 only in case of having to de-consolidate the loads (load C back into load A and load B).

Figure 3B:
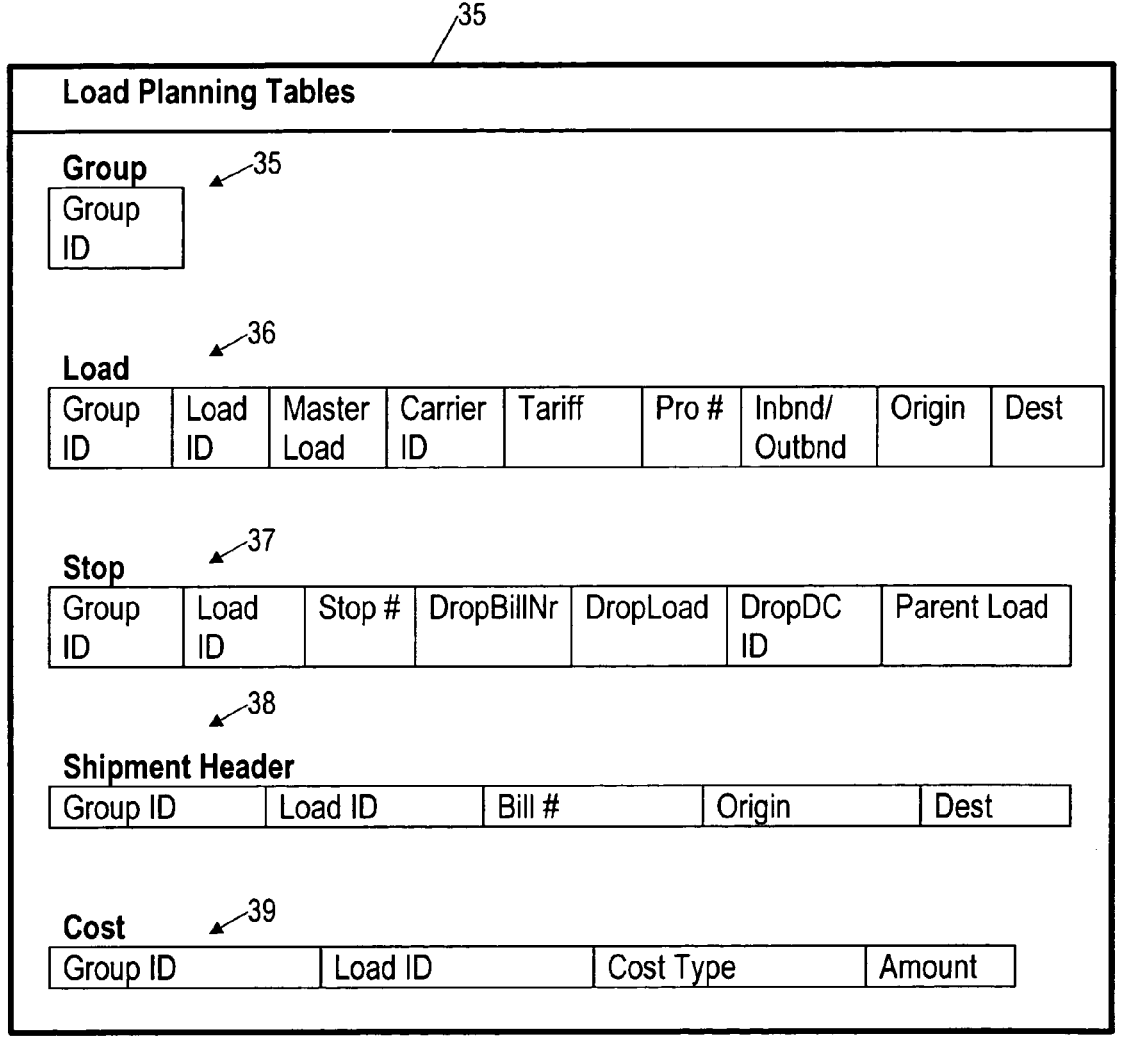
FIG. 3B is a schematic diagram setting out the load planning tables of the present invention.

Referring now to FIG. 3B, the load planning tables 35 of the present invention are shown to correspond to the load list structures 31–33 used in planning the shipping of a parcel. The load planning tables include: a load table 36, a stop table 37, a shipment header table 38, and a cost table 39. Records are selected from each of the tables in each set based on a group identification (ID) stored in a separate group ID table 35, also considered a load planning table. Each of the tables consists of one or more records, each record consisting of one or more fields. Each table is designed to use a group identifier from the group table as an index (key), although not necessary a unique index; in other words, except for the group table 35, each of the tables 36–39 can have more than one record with the same group identifier.

In addition, since a load can have more than one stop and can include more than one shipment and also can have more than one component cost, the field load identifier is a unique index in the load table 36 (in addition to the non-unique group identifier index), and load identifier serves as a non-unique index into the stop table 37, the shipment header table 38, and the cost table 39. Finally, since a stop can result in the delivery of zero, one or more shipments, the stop table 37 and the shipment header table 38 are related through the drop bill number (DropBillNr) of the stop table 37 and the bill number of the shipment header table 38.

In the load table 36, the master load field identifies a load that contains the load indicated by the load identifier, as well as other loads. All loads contained by a master load are termed nested loads. The tariff field indicates a particular service by the carrier indicated by the carrier identifier, e.g. "Next Day Air."

In the stop table 37, the drop distribution center (DC) identifier is used to indicate whether a stop is at a distribution center and if so, which distribution center.

Referring now to FIGS. 4A–B through 10A–B, examples are shown of records from the load planning tables corresponding to various kinds of shipping plans. Table 2 provides a legend for the labels used to indicate values shown in FIGS. 4B–10B for the records culled from the load planning tables based on the group identifier field.

TABLE 2

Legend for use with FIGS. 4B–10B.

| Label | Meaning |
|---|---|
| Gx | identifier for a group of shipments and associated loads (assigned to a batch of selected shipments/parcels for which shipping is to be planned) |
| Bx | identifier for a bill or shipment |
| Lx | identifier for a load |
| MLx | identifier for a master load. (A master load contains other, nested loads.) |

TABLE 2-continued

Legend for use with FIGS. 4B–10B.

| Label | Meaning |
|---|---|
| Sx | identifier for a stop in a multistop load. (A stop for a direct shipment is always "0" or null-valued, because there are no stop charges for a direct shipment. Two shipments having the same stop identifier are considered to be a consolidation.) |
| DCx | identifier for a distribution center or pool point. (When a shipment leaves a distribution center on the way toward its destination, it is considered to be a new load. A load that is dropped off at a distribution center results in the value of the load's distribution center identifier being given the value of the identifier for the forwarder.) |

Referring now in particular to FIGS. 4A and 4B, an example of records 41 from each of the load planning tables is shown in case of a direct shipment of a single parcel (shipment) from an origin 42 identified as 55420 to a destination 43 identified as 60601. Each of the records is pulled from the various load planning tables using the index G1, a group identifier. The cost table shows that three component costs (charges) are associated with the direct shipment: a line haul (LINEHL) charge of $25.00, a collect on delivery (COD) charge of $10.00, and a Saturday delivery (SATDEL) charge of $5.00.

Figures 5A, 5B:
FIG. 5A is a schematic illustration of a direct consolidation.
FIG. 5B shows corresponding records from the load planning tables.

Referring now in particular to FIGS. 5A and 5B, an example of records 51 from each of the load planning tables as shown in case of a direct consolidation of two parcels (shipments) from an origin 52 identified as 55420 to a destination 53 identified as 60601. Again all of the records in the load planning tables corresponding to this shipping plan are identified by a group identifier having a value G1. The load table records show that there is a single load identified with the group identifier G1. The stop table records indicate that group identifier G1 and load identifier L1 have two drop-bill numbers, B1 and B2, which indicates that two separate loads were consolidated in a single load.

Referring now in particular to FIGS. 6A and 6B, an example of records 61 from each of the load planning tables are shown in case of a multi-stop truckload shipping plan. Here there is a single load, shipped as a truckload, but shipments of the load are delivered to different destinations. A shipment with drop bill number B1 is delivered to a destination 63 identified as 60601, and a shipment with drop bill number B2 is delivered to a destination 64 identified as 10101. Both shipments originate at an origin 62 identified as 55420. The delivery makes a first stop S1 at the destination B1, and a second stop S2 at the destination B2.

Referring now in particular to FIGS. 7A and 7A, an example of records 71 from each of the load planning tables is shown in case of a distribution center truckload shipping plan. Here a load L1 originates at an origin 72 identified as 55420 and is delivered to a distribution center 73 identified as DC1 (and having a corresponding destination identifier 60601), and the load is partitioned into two loads L2 and L3, with L2 then delivered out of the distribution center to a destination 74 identified as 10101, and the load L3 delivered to a destination 75 identified as 30301. The load table records show that different carriers are used for each of the three legs involved in this shipping plan: a carrier with identifier DART providing loan L1 to the distribution center, a carrier with identifier UPS providing the load L2 to the destination 10101, and a carrier with identifier RDWI delivering load L3 to the destination 30301.

Figure 8A:
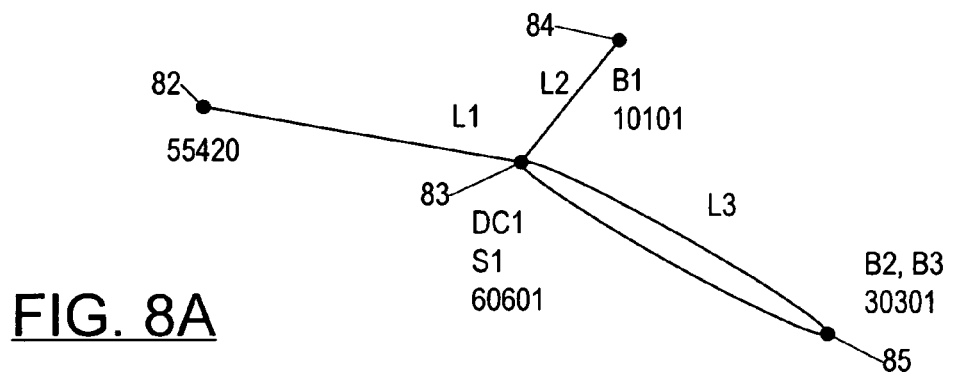
FIG. 8A is a schematic illustration of a consolidation out of a distribution center.

Referring now in particular to FIGS. 8A and 8B, an example of records 81 from each of the load planning tables is shown in case of a consolidation out of the distribution center. Here a load L1 originates at an origin 82 identified as 55420 and is dropped at a distribution center 83 identified as 60601. A load L1 is there broken into load L2 and load L3. Load L3 contains two shipments, B2 and B3. Load L2 is delivered to a destination 84 identified as 10101, and load L3 is identified to a destination 85 identified as 30301. The individual shipments (corresponding to drop bill nos. B2 and B3) of the load L3, since they are delivered as a single load, are considered to be a consolidation that is delivered out of the distribution center.

Figure 9A:
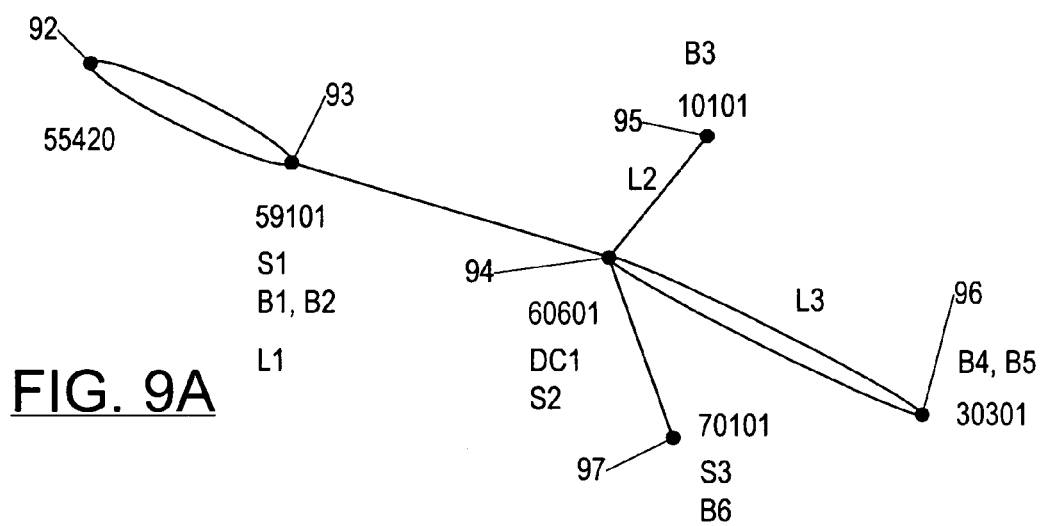
FIG. 9A is a schematic illustration of a combination multistop, distribution center, and consolidation.

Referring now in particular to FIGS. 9A and 9B, an example of records 91 from each of the load planning tables is shown in case of a shipping plan that is a combination multi-stop, distribution center and consolidation. Here, a load L1 originates at an origin 91 identified as 55420. The load L1 is a consolidation of shipments B1 and B2, but in addition contains nested loads L2 and L3 as well as shipment B6. Shipments B1 and B2 are delivered to a destination 93 identified as 59101, which is stop #1 for load L1. What remains of load L1, namely loads L2 and L3 and shipment B6, is then delivered to distribution center DC1 at location 94 identified as 60601. Loads L2 and L3 are then broken out of load L1, and what remains of load L1, namely shipment B6, is delivered to destination 97 identified as 70701, which is stop 3 for load L1. Load L2 is delivered from the distribution center 94 to a destination 95 identified as 10101. Load L2 contains shipment B3. Load L3 is delivered from the distribution center 94 to a destination 96 identified as 30301. Load L3 contains shipments B4 and B5.

Figure 10A:
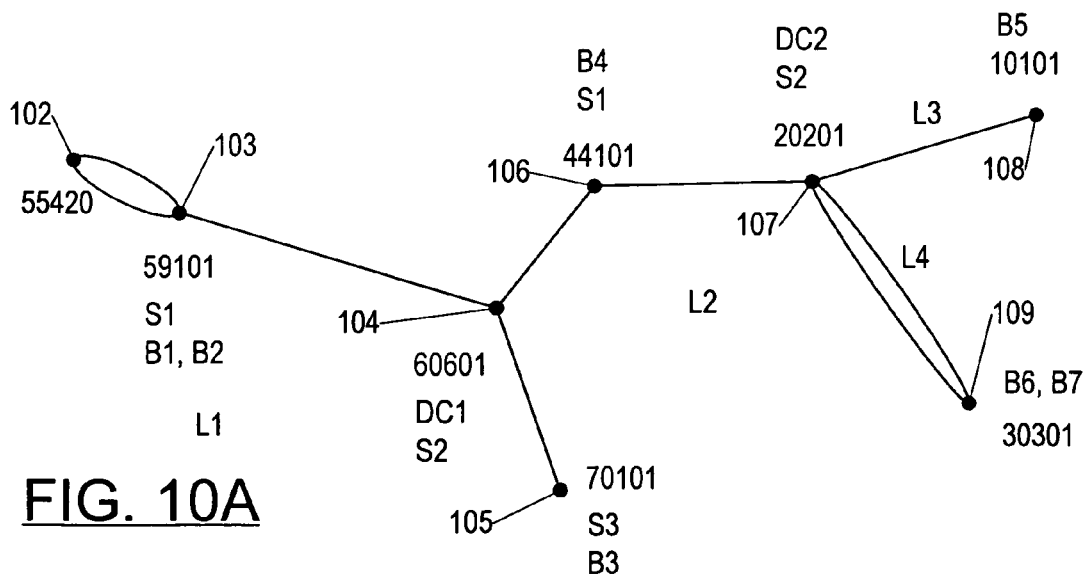
FIG. 10A is a schematic illustration of nested loads.

Referring now in particular to FIGS. 10A and 10B, an example of records 101 from each of the load planning tables is shown in case of a shipping plan involving nested loads. In this example, a load L1 begins its journey from an origin 102 identified as 55420. Load L1 contains shipments B1, B2 and B3, as well as load L2, which is therefore a nested load. Shipments B1 and B2 are dropped at a destination 103 identified as 59101, who is stop #1 for load L1. Load L1 continues on to a next stop 104, which is a distribution center DC1 identified as location 60601. This is stop #2 for load L1. At the distribution center, nested load L2 is carved out of load L1, leaving shipment B3, which is delivered to a destination 105 identified as 70701. Nested load L2 is delivered to a destination 106 identified as 44101, where shipment B4 is delivered. Load L2 then continues to a location 107, which is a distribution center DC2 identified as 20201. This is stop #2 for load L2. At the distribution center DC2, the nested loads of L2, namely L3 and L4, are split up, with L3 then delivered to a destination 108 identified as 10101. Load L3 contains only shipment B5. Load L4 is delivered out of the distribution center DC2 to a destination 109 identified as 30301. This is the one and only stop for load L4 and it includes shipments B6 and B7.

Scope of the Invention

It is to be understood that the above-described arrangements are only illustrative of the application of the principles of the present invention. Numerous modifications and alternative arrangements may be devised by those skilled in the art without departing from the spirit and scope of the present invention, and the appended claims are intended to cover such modifications and arrangements.

What is claimed is:

1. A system for managing shipping parcels, the system comprising:

a) a planning system, responsive to requests to plan shipping for a parcel, and responsive to stored planning information and to interactive planning information, for providing a rated route;

b) a shipping database, responsive to updates to planning information, for providing stored planning information, further responsive to a customer order including shipping requirements for the customer order, and further responsive to the rated route, for providing a stored rated route for shipping the parcel, the shipping database including a set of load planning tables, the set of load tables comprising:

i) a group table, for storing group identifiers, each group identifier used to identify a group of one or more parcels;

ii) a load table, for storing records of attributes associated with a load, which is in turn associated with a group, each record having a group identifier field and a load identifier field;

iii) a stop table, for storing records of attributes associated with a stop, which is in turn associated with a load, which is in turn associated with a group, each record having a group identifier field, a load identifier field, a stop identifier field, and a drop bill number field;

iv) a shipment header table, for storing records of attributes associated with a shipment, which is in turn optionally associated with a stop, which is in turn associated with a load, which is in turn associated with a group, each record having a group identifier field, a load identifier field, a bill number field that serves as a shipment identifier and optionally relates the record to a record in the stop table via the drop bill number field in records of the stop table, an origin identifier field, and a destination identifier field; and v) a cost table, for storing records of attributes associated with a component cost of a load, which is in turn associated with a load, which is in turn associated with a group, each record having a group identifier field, a load identifier field, a field indicating a cost type, and a field indicating a cost amount, wherein the set of load planning tables applies business rules to a consignee party, a shipper party and to a third party, such that a route priority table is used to determine a time of arrival, a party responsible for payment and a destination location and applies the business rules to events and sub-events to determine delivery parameters.

2. A system as in claim 1, wherein the records of the load table also include fields for indicating a master load identifier, a carrier identifier, a tariff identifier, an origin and a destination.

3. A system as in claim 2, wherein each record of the load table also include a field for indicating a pro number, a field for an inbound/outbound indicator, a field indicating an origin, and a field indicating a destination.

4. A system as in claim 1, wherein the records of the stop table also include fields for indicating a drop load identifier, a drop distribution center identifier, and a parent load.

* * * * *